Nov. 26, 1968    D. F. POTTS    3,413,021

TUBULAR COUPLING

Filed Oct. 20, 1965

INVENTOR.
DEAN F. POTTS

BY Fay & Fay

ATTORNEYS

United States Patent Office 3,413,021
Patented Nov. 26, 1968

3,413,021
TUBULAR COUPLING
Dean F. Potts, Toledo, Ohio, assignor to Ferry Cap and Set Screw Company, Cleveland, Ohio, a corporation of Ohio
Filed Oct. 20, 1965, Ser. No. 498,620
9 Claims. (Cl. 285—319)

ABSTRACT OF THE DISCLOSURE

A tubular coupling having a male portion with a lip at its end and slots which begin at the lip and extend along a portion of the length of the tube. A female portion of the coupling has an internal groove located at a distance from its mount to receive the lip on the male portion.

---

This invention relates to coupling sections of tubing. More specifically, this invention contemplates the ends of tubular sections formed in a manner so that they will fit together in a joint which will withstand great compressive forces.

The problem arises in forming a joint between two sections of tubing that it is not able to withstand great compressive forces along its longitudinal axis. Of course, many solutions have been proposed to solve this problem. For example, telescoping sections are often used along with rivets or spring rivets in order to connect tubular members. However, these telescoping sections and rivets tend to be expensive to manufacture and have a very poor appearance. They are also relatively unreliable and very difficult to manufacture.

U.S. Patent No. 367,578 by Babb teaches that a male and female section may be used in order to join tubular sections. That is, it suggests that a male portion be provided with a bulbous portion at the end thereof, an enlarged ridge at a given distance from this end, and longitudinal slots along the length of this male portion. A female portion is adapted to fit over the male portion. The female portion has an internal diameter for its forward part larger than the male portion and has a bead or annular bulbous enlargement at a distance from its end. Behind the bead on the female portion is a section having a reduced internal diameter. The two sections are so constructed that the slots in the male portion will allow it to contract as it is pushed into the female section until it reaches the bead in the female section. At this point, the bulbous portion on the male section will expand inside the bead of the female portion and the ridge on the male section will abut against the mouth of the female section. The Babb patent anticipates that further movement into the female section would be prohibited by the ridge of the male section abutting against the mouth of the female section and the bulbous portion abutting against the inside of the bead on the female portion. The disadvantage of this configuration is that the coupling cannot withstand large compressive forces. That is, when a compressive force is applied to the coupling, most of the stress is on the mouth of the female section as it abuts against the ridge on the male section so that it will bend or otherwise distort the female section. The female section is compelled to absorb the compressive forces since the bulbous portion inside the bead can only withstand a small amount of stress. This relatively small tolerance of compressive forces results from the rounded surface of the bulbous portion having a tendency to slip out of the rounded inner section of the bead on the female portion.

Any compressive forces that the bulbous portion inside the bead could withstand were the result of the reduced internal diameter of the female section behind the bead. Needless to say, the requirement of manufacturing a female portion having two internal diameters caused a substantial increase in the cost of producing the coupling.

Summary of the invention

The present invention solves the problem of the prior art by providing an inexpensive coupling that will be able to withstand relatively large compressive forces without any distortion of the material. That is, this invention contemplates a tubular coupling which has a male tube, a reduced diameter portion for length along one end of the male tube, an outwardly extending lip at the end of the male tube and slots beginning at the end of the male tube and extending along the length of the reduced diameter portion. It also anticipates that a female tube be provided having an internal groove along the internal periphery of the second tube, the back portion of the groove located at a distance from the end of the second tube not greater than the length of the reduced diameter portion of the first tube so that when the reduced diameter portion of the first tube is inserted into the end of the second tube, the outwardly extending annular lip of the male tube will expand inside the internal groove of the female tube and abut against it thus prohibiting the male tube from moving any further into the female tube.

In this manner, any compressive forces will be primarily absorbed by the lip on the male tube abutting against the internal groove on the female tube.

This solution of the coupling problem for tubular members is particularly advantageous since it is very simple and inexpensive to make. The coupling may be constructed from a single thin-walled tube of the same diameter. The tube need only be cut and swaged into the correct shapes as described more fully hereinafter.

Figure 1:
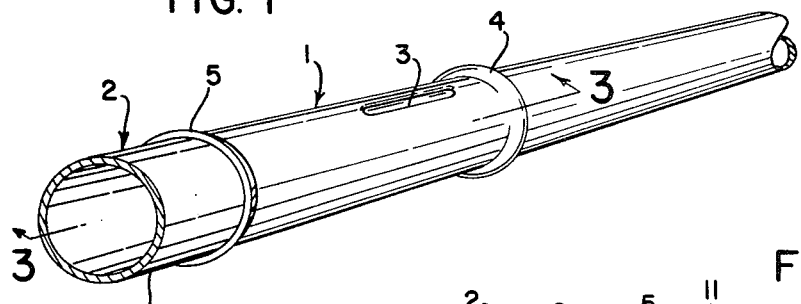
FIG. 1 shows a perspective view of the tubular coupling as in its interlocked position.

FIG. 1 shows a perspective view of the coupled tubular section. The section includes a female portion 1 and a male portion 2. The female portion 1 has a flared mouth 5, detents 3 (only one shown), and an annular bead 4 back from the mouth 5.

Figure 2:
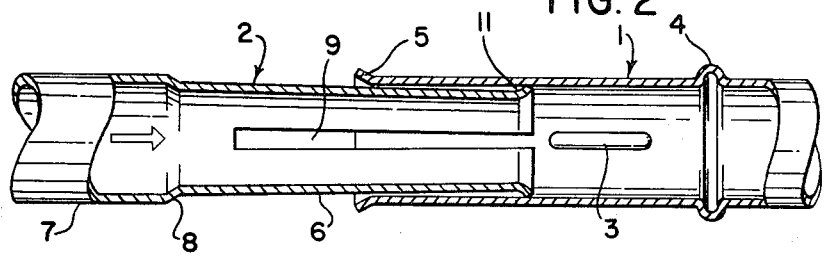
FIG. 2 is a longitudinal, partial cross-section of the coupling while being interlocked.

FIG. 2 shows a longitudinal partial cross-section of the coupling. In this figure, male portion 1 is partially inserted into the female portion 2. The male portion 2 has a reduced diameter section 6 and a section of a greater diameter 7. A sloping portion 8 is provided between the reduced diameter section 6 and the greater diameter section 7. Slots 9 are positioned along the reduced diameter section 6. Only one of the slots is shown in FIG. 2; however, it is anticipated that two or more slots may be used. The slots 9 begin at the open end of the male portion 2 and are generally longitudinal; however, it is anticipated that these slots may be spiral or generally of another configuration as long as the slots begin at the open end of the male portion 2. This is in order that the male portion may be compressed as it slides into the female portion. An outwardly extending annular lip 11 is provided at the end of the male portion 2. This annular lip 11 is present in order that it may expand into the internal groove or bead 4 of the female portion 1 when the reduced diameter section 6 is fully inserted into the female portion 1. On the female portion 1, a longitudinal detent 3 extending inwardly along the length of the tube is provided to interlock with the slot 9. Again, two or more detents may be provided, as long as they coincide with the given slots on the male portion 2.

Figure 3:
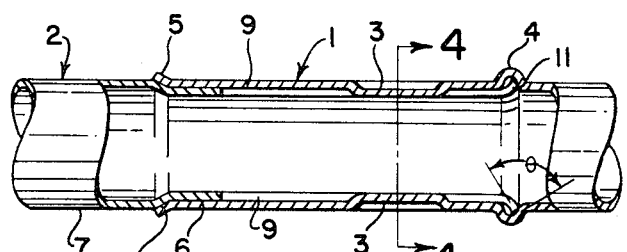
FIG. 3 shows a longitudinal, partial cross-sectional view of the interlocked coupling taken on line 3—3 of FIG. 1.

FIG. 3 shows a longitudinal, partial cross-section of the tubular coupling wherein the male portion 2 is completely inserted into and interlocked with the female portion 1. The annular lip 11 of the male portion 2 is now expanded into the internal groove or bead 4 of the female portion 1. The detents 3 are interlocked with the slots 9 in the male portion 2. The flared mouth 5 abuts against the transition portion 8 of the male section 2. The angle of the flared mouth is variable but should be made to coincide with the angle of the transition portion 8. The length of the female section from the flared mouth 5 to the internal groove or bead 4 should be such that both the annular lip 11 and sloping portion 8 are abutting against the corresponding sections, bead 4 and the flared mouth 5, of the female portion 1. This is in order that both parts of the male and female portions should absorb the stresses as a result of any compressive forces on the tubular coupling. However, it is anticipated that the female portion 1 from the flared mouth 5 to the bead 4 may be smaller than the length of the reduced portion 6 of the male member 2. If this were true, then the inner back portion of the internal groove or bead 4 on the female portion 1 and the annular lip 11 on the reduced diameter section 6 would support all the stress of any compressive forces after the male portion 2 and the female portion 1 have been interlocked.

Figure 4:
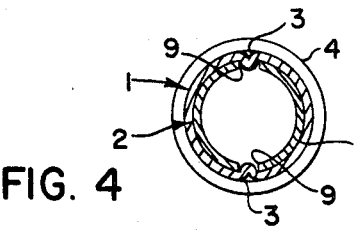
FIG. 4 shows a cross-sectional view of the interlocked male and female sections taken on line 4—4 of FIG. 3.

FIG. 4 shows a cross-sectional along 4—4 of FIG. 3. It shows the detents 3 interlocking with the slots 9, which are in the reduced portion 6. The bead 4 of the female portion 1 is also illustrated. As shown in FIGS. 3 and 4, the female and male members cannot move relative to each other due to the detents 3 interlocking with the slots 9.

In order to join the tubular sections, it is necessary that the mouths of the respective tubes be placed together. The size of the flared mouth 5 must be such that the annular lip 11 of the male portion 2 will fit within it. When compressive force is applied to the male and female sections, the annular lip 11 will slide within the flared mouth 5 and the reduced diameter portion 6 will be contracted. This contraction is permitted because of the slots 9. As the male portion 2 slides further into the female portion 1 it is necessary that the slots 9 of the male portion 2 be aligned with the detents 3 of the female portion 1. Once this is done, the male portion 2 will then slide completely into the female portion 1 until the annular lip 11 expands into the internal groove or bead 4 of the female portion 1. Upon reaching this position, the annular lip 11 will abut against the back portion of the internal groove 4 so that any further axial movement is prohibited. It is critical in this invention that the annular lip 11 does abut against the inner, back portion of the bead 4 when the coupling is subjected to compressive forces. It is because of this abutment that the coupling is able to withstand very large compressive forces. That is, the lip 11 is formed so that its end will engage the internal groove 4 at an angle which will encourage the lip 11 to hold firm or actually move further into the internal groove 4 when a compressive force is applied. This angle is generally shown in FIG. 3 as θ. It is determined by the slope of the internal groove at the point it is contacted by lip 11 and the slope of lip 11. An angle of 90° for θ has been found to be preferable. If θ is greater than 90°, then there will be a tendency for the lip 11 to be cammed out of the internal groove 4. However, friction would hold lip 11 in internal groove 4 at angles slightly greater than 90°. If θ is too small, say around 10°, then it would also have a tendency to slip out of internal groove 4. Angles of 30 to 90° for θ have been found to be workable; but, again, 90° has been determined to be the most advantageous. When a suitable angle is used it has been found that the tubing itself will actually collapse before the coupling fails.

It must also be noted at this point that the female portion 1 has generally the same diameter over its entire length except for bead 4 and flared mouth 5. This is only possible because the male portion 2 has an annular lip 11 which locks into the internal groove 4 very firmly, instead of a bulbous end which will slip, as in the prior art.

For maximum strength of the coupling, the distance on the female section 1 from flared mouth 5 to internal groove or bead 4 may be made exactly equal to the length of the reduced diameter portion 6 of the male member 2. When this is done, the flared mouth 5 of the female portion 1 will abut against the sloping portion 8 of the male member 2 and also help to absorb any compressive forces on the male and female coupling.

The coupling may be separated by merely applying tension to the male and female portions.

Figure 5:
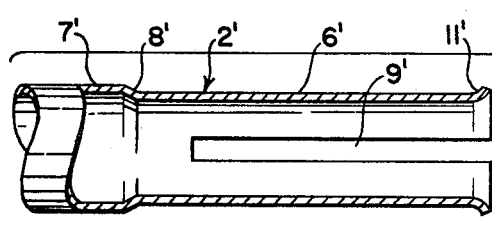
FIG. 5 shows a longitudinal, partial cross-sectional view of the male and female sections in their confronting positions.
Figure 5:
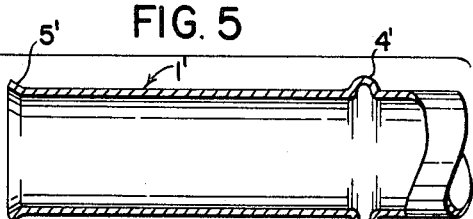

FIG. 5 shows substantially the same coupling as in FIG. 2 except that the detents 3 have been eliminated. Because of the similarity of FIG. 5 to FIG. 2, the same numbers with primes have been used to indicate corresponding parts. Since the female tube 1 does not have the detents that the earlier embodiment of this invention had, when the male section 2' is inserted into the female section 1' there will be nothing to interlock with the slots 9' on the male member 2'. The result of this will be that once the male portion 2' is interlocked into the female portion 1' they will be able to rotate relative to one another without any hindrance other than frictional interaction.

Figure 6:
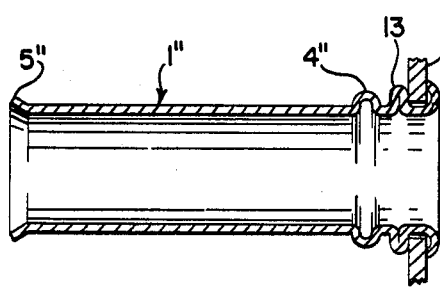
FIG. 6 shows an alternate form of the female section.

FIG. 6 shows an alternate embodiment of the female section of the tubular coupling. The body portion 1" has a flared mouth 5" at one end thereof. A bead 4" is provided at a given length away from the flared mouth 5". An annular ridge 13, formed by buckling the female portion behind the bead 4, and a U-shaped or hooked mouth 14 define a grasping means. A member 15 may then be grasped to hold it firmly to female portion 1". The member 15 will usually be a utensil of some type, such as a brush. It is anticipated that the female socket 1" may also have detents in order to stop any rotation of the male member therein.

In order to prepare the coupling of FIGS. 2 and 3 it is possible to begin with a single piece of thin-walled tubing. The tubing could then be cut into sizes desired and formed. The male portion 2 would generally be formed by swaging a portion of it to reduce its diameter, putting a lip at the end and then cutting slots along its length. The female portion 1 is formed simply by flaring its mouth and indenting its inside so that the bead 4 is created.

This relatively simple method of creating the coupling makes it extremely desirable for economic reasons.

While this invention has been described with reference to the preferred embodiment, it is anticipated that changes will be obvious to one skilled in the art. For example, the slot configurations and detents may vary widely without deviating from the spirit of this invention. It is further realized that various angles are possible for the flared mouth 5 and in fact the coupling could operate without the flared mouth 5. The male portion 2 could be of one diameter rather than two. This diameter would, of course, be that of the reduced diameter section 6 so that it would fit into the female portion 1.

I claim:
1. A thin walled tubular coupling comprising:
   a thin walled male portion;
   a reduced substantially constant diameter section having a substantially constant wall thickness for a length along one end of said male portion;
   a lip at said end of said reduced diameter section of the male portion, said lip extending radially outwardly from the periphery of said reduced diameter section;

slots beginning at said end of said male portion and extending along a portion of the length of said reduced diameter portion so that said reduced diameter section of said male portion may contract and expand;

a thin walled female portion; and an internal circumferentially extending groove formed by the wall of said female member along but extending radially outwardly from the internal periphery of said female portion, the internal diameter of said female portion being substantially the same on each side of said groove, the back wall of said internal groove located at a distance from the mouth of said female member not greater than the length of said reduced diameter section so that when the reduced diameter section of the male portion is inserted into the mouth of the female portion, the annular lip of the male portion will expand inside the internal groove of the female portion and abut against its back wall, said back wall of the internal groove and said lip abutting at such an angle to form means for always maintaining said lip in said internal groove when said male and female portions are placed under compressive forces.

2. The tubular coupling of claim 1 wherein a plane of tangency to the back wall of the internal groove and the lip on the male portion form an angle of no greater than about 90° where they abut.

3. The tubular coupling of claim 2 wherein said female tube has inwardly protruding detents on it located between said flared mouth and said internal indentation and are positioned to interlock with the slots on said male tube, thus prohibiting any rotation of said tubes relative to each other.

4. The tubular coupling of claim 2 wherein an annular ridge is formed on the outer surface of said female portion and corresponds to the internal groove on the inner surface of said female portion, and an outwardly extending, hooked mouth behind said annular ridge in order to form a grasping means.

5. The tubular coupling of claim 2 wherein the outside diameter of said female tube is substantially equal to the outside diameter of said male tube from a sloping transitional area between the reduced diameter section and the unreduced section rearwardly.

6. The tubular coupling of claim 5 wherein said female tube has an outwardly extending flared mouth at said end which engages said sloping transitional area.

7. The tubular coupling of claim 2 wherein said slots are longitudinal.

8. A thin walled tubular coupling comprising:

a thin walled male portion;

a lip at one end of said male portion;

slots beginning at said end of said male portion and extending along a portion of the length of said male portion so that said male portion may contract and expand;

a thin walled female portion; and an internal circumferentially extending groove formed by the wall of said female member along but extending radially outwardly from the internal periphery of said female portion so that when said male portion is inserted into the mouth of the female portion, the annular lip of the male portion will expand inside the internal groove of the female portion and abut against its back wall, the internal diameter of said female portion being substantially the same on each side of said groove, the back wall of the internal groove and said lip abutting at such an angle to form means for always maintaining said lip in said internal groove when said male and female portions are placed under compressive forces.

9. The tubular coupling of claim 8 wherein said female portion has inwardly projecting detents on it positioned to interlock with said slots on said male portion thus prohibiting any rotation of said male and female portion relative to each other.

References Cited

UNITED STATES PATENTS

| | | | |
|---|---|---|---|
| 367,578 | 8/1887 | Babb | 285—66 |
| 528,816 | 11/1894 | Smiley | 285—424 X |
| 1,005,145 | 10/1911 | Bicalky | 285—322 |
| 2,180,120 | 11/1939 | Saltzer | 287—124 |
| 2,378,174 | 6/1945 | Beede | 285—7 |
| 2,582,446 | 1/1952 | Martinet | 285—7 |
| 2,585,887 | 2/1952 | Woodward | 285—319 X |
| 2,727,536 | 12/1955 | Tennison | 285—424 X |
| 2,947,557 | 8/1960 | Schwab et al. | 287—58 |

FOREIGN PATENTS

| | | |
|---|---|---|
| 567,396 | 9/1933 | Germany. |

CARL W. TOMLIN, *Primary Examiner.*

DAVE W. AROLA, *Assistant Examiner.*